July 12, 1927.
J. A. LE BLANC
1,635,944
CABLE GUIDE
Filed Aug. 2, 1926
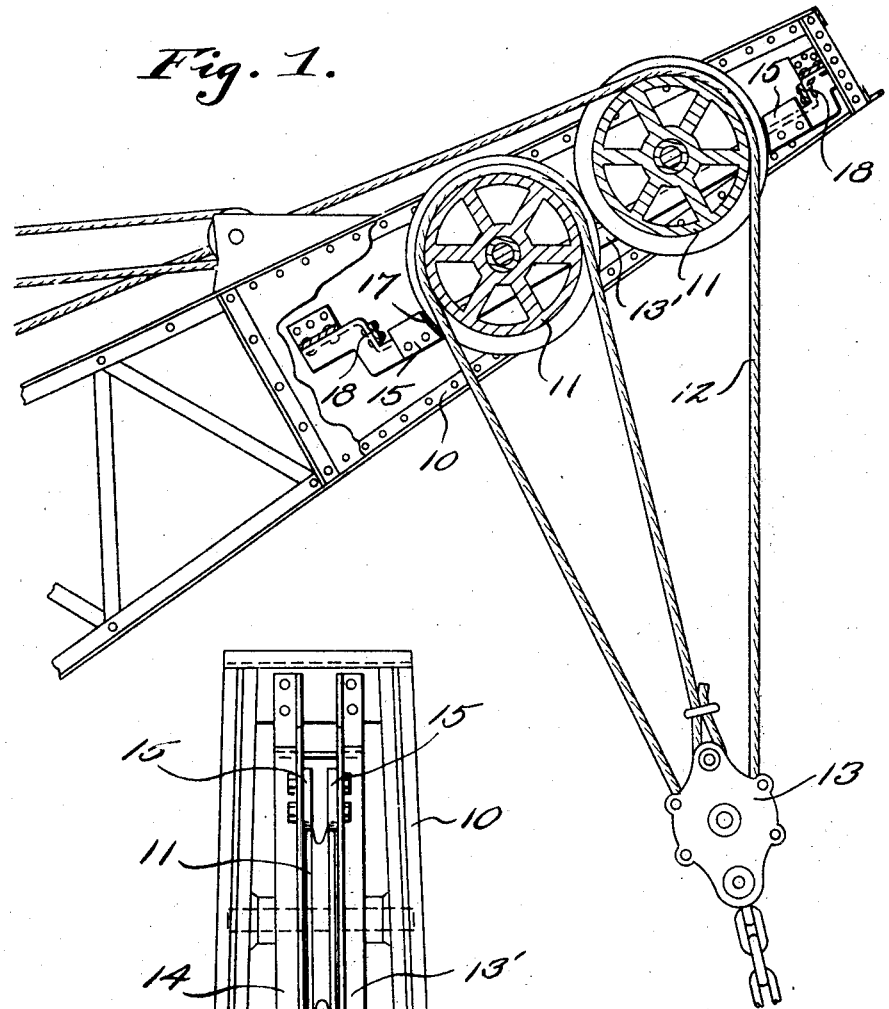

Patented July 12, 1927.

1,635,944

UNITED STATES PATENT OFFICE.

JOHN ANDREW LE BLANC, OF WHITE CASTLE, LOUISIANA.

CABLE GUIDE.

Application filed August 2, 1926. Serial No. 126,555.

The present invention aims to provide a novel form of cable guide for dredging or excavating machines and the like, whereby the cable can be guided into a sheave at different angles without any possibility of the cable riding over or jumping off the sheave, which usually results in breakage of the cable and expenditure of time and labor necessary to repair the same.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a fragmentary view partly in section of a boom showing the cable guide for the sheaves thereon.

Figure 2 is a fragmentary bottom plan view of Figure 1.

Referring to the drawing in detail 10 indicates the boom of the dredging or excavating machine or the like upon which is journaled one or more sheaves 11 over which the cable 12 is trained to the block 13. In order to permit this cable to be guided into the sheave or sheaves at different angles without allowing the cable to ride over the flange of the sheave, or jump off the latter with the attending difficulties above mentioned, I preferably make use of a pair of angle iron bars 13′ and 14 respectively which are arranged at opposite sides of the sheaves and terminally supported upon the boom in any suitable manner, the angle iron bars being so closely arranged to the sheaves as to make it impossible for the cable to pass off the sheaves between the latter and the bars 13′ and 14. In other words there is very little clearance space between the angle iron bars and the sheaves 11, the arrangement of the bars with relation to the sheaves preventing the cable from jumping off the latter. Where two sheaves are used as illustrated in Figure 1, each angle iron bar is equipped with a plate or block 15, which may be riveted or otherwise suitably secured to the bar and positioned with relation to the adjacent sheave, as to make it impossible for the cable to wedge itself between the flange of the sheave and the adjacent angle bar as will be readily understood. Each plate or block 15 is of course made of a sufficient size for this purpose, while the edge of each block or plate lying next to the sheave is curved as at 17 to conform to the curvature of the sheave, and is arranged directly adjacent the flange of the latter for the purpose above mentioned. The angle iron bars are connected together adjacent their ends by means of a cross member 18, so that the said bars can not spread when the cable is subjected to a diagonal pull or strain.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. The combination with a support and a sheave journaled thereon, of a cable guide comprising spaced angle bars mounted on the support at opposite sides of the sheave and in close proximity thereto, and a block supported on said angle bar directly in advance of said sheave and having a curved edge conforming to and arranged in close proximity to the periphery of said sheave, and cooperating with said bars to permit a cable to be guided into the sheave at different angles without jumping the latter.

2. The combination with a support, and a plurality of sheaves journaled thereon, of a cable guide comprising spaced angle iron bars mounted on the support at opposite sides of the sheaves and arranged in close proximity thereto, blocks carried by each bar and arranged in close proximity to the periphery of the adjacent sheave, and cooperating with said bars to permit a cable to be guided into said sheaves from different angles without jumping said sheaves, each block having one curved edge to conform to the curvature of the sheave, and cross members connecting said bars to prevent spreading of the latter on a diagonal pull of the cable.

In testimony whereof I affix my signature.

JOHN ANDREW LE BLANC.